United States Patent [19]

Grondin et al.

[11] Patent Number: 5,035,811
[45] Date of Patent: Jul. 30, 1991

[54] FILTER PUMP SYSTEM

[75] Inventors: David H. Grondin, Columbia; Irene M. Schade, East Hartford, both of Conn.

[73] Assignee: United Technologies Corporation, Hartford, Conn.

[21] Appl. No.: 410,196

[22] Filed: Sep. 21, 1989

[51] Int. Cl.$^5$ .............................................. B01D 37/00
[52] U.S. Cl. .................................. 210/806; 210/314; 210/416.1; 210/416.5
[58] Field of Search ..................... 210/806, 314, 323.1, 210/416.1, 416.5

[56] References Cited

U.S. PATENT DOCUMENTS

| | | |
|---|---|---|
| 3,064,813 | 11/1962 | Smith .................................... 210/67 |
| 3,708,806 | 1/1973 | Kemper .................................... 4/10 |
| 3,989,797 | 11/1976 | Brady et al. ........................ 423/242 |
| 4,108,734 | 8/1978 | Kwasnoski et al. ..................... 203/7 |
| 4,707,269 | 11/1987 | Ohue et al. ........................ 210/806 X |
| 4,761,239 | 8/1988 | Wardell ............................... 210/727 |
| 4,769,158 | 9/1988 | Eckert .............................. 210/806 X |
| 4,772,402 | 9/1988 | Love ............................... 210/806 X |
| 4,786,420 | 11/1988 | Dalessandro ................... 210/806 X |
| 4,836,937 | 6/1989 | Homer ................................. 210/808 |

Primary Examiner—Charles Hart

[57] ABSTRACT

Filtering liquids, such as slurries, oils, coolants, paints, and others, is an inefficient, time consuming process. For example, slurries are commonly filtered with a hand screen. However, a filter pump connected to at least two filters connected series, can be utilized to efficiently filter liquids.

4 Claims, 1 Drawing Sheet

FILTER PUMP SYSTEM

The Government has rights in this invention pursuant to a contract awarded by the Department of the Air Force.

DESCRIPTION

1. Technical Field

This invention relates to a filter pump system, and especially to filtering liquids using a filter pump system.

2. Background Art

Filtering liquids, such as slurries, oil, coolant, solvent, and paints, can be a time consuming, tedious job. As is well known in the art, hand-held screening devices can be used to filter ceramic slurries. This technique is ineffective and/or inefficient, especially in the large tanks; the screens are relatively small and clog quickly. For example, shell mold production utilizes large slurry tanks. Due to the location of the sites and tank sizes, it is impractical to transfer the slurry to off site decontaminating facilities, and the hand screening technique which is the only alternative currently available, is ineffective. Slurry characteristics, such as with ceramic slurries which have a short life, also make transportation impractical. U.S. Pat. No. 3,064,813 discloses a technique of filtering slurries by removing moisture and utilizing rotary drum filters (incorporated herein by reference).

Oils, on the other hand, are commonly disposed of; wasted, or sent out to be recycled. At times, the most cost effective technique of maintaining contaminant free oil is to replace the oil once contaminated. Coolant, similar to oil is either replaced or transferred to off site decontaminating facilities; although possibly an economically sound process, not a convenient one.

Although some techniques of removing contaminants from liquids exist, new, efficient, practical techniques are fervently sought.

DISCLOSURE OF INVENTION

The present invention comprises a pump and filters to filter liquids in situ, and a method to use the same. An intake hose is connected to a filter. The outlet from the filter is connected to a pump, which may be a diaphragm pump for slurries, oils, and others, or a centrifugal pump for coolant. The pump outlet is connected to a final filter. Slurry, for example, is drawn through the inlet hose into the initial filter. The slurry passes through the initial filter, the larger contaminants being removed, out the outlet hose, through the diaphragm pump, and out through the final filter where most of the remaining contaminants are removed.

The foregoing and other features and advantages of the present invention will become more apparent from the following description and accompanying drawings.

BEST MODE FOR CARRYING OUT THE INVENTION

During operation, slurries, oils, coolants, and other liquids, used in factories for example, can become contaminated. Removal techniques, such as hand screening which can take up to 8 hours per each 500 gallon tank, are ineffective or expensive. In some cases, the most cost effective method of removing contaminants is to discard the liquid, such as coolant, and replace it with a fresh supply; creating significant waste. If the liquid could be decontaminated, it could be reused. The present invention is a safe, quick cost effective method of removing solid contaminants; on site filtering of a 500 gallon tank requiring only about 15 minutes.

Figure 1:
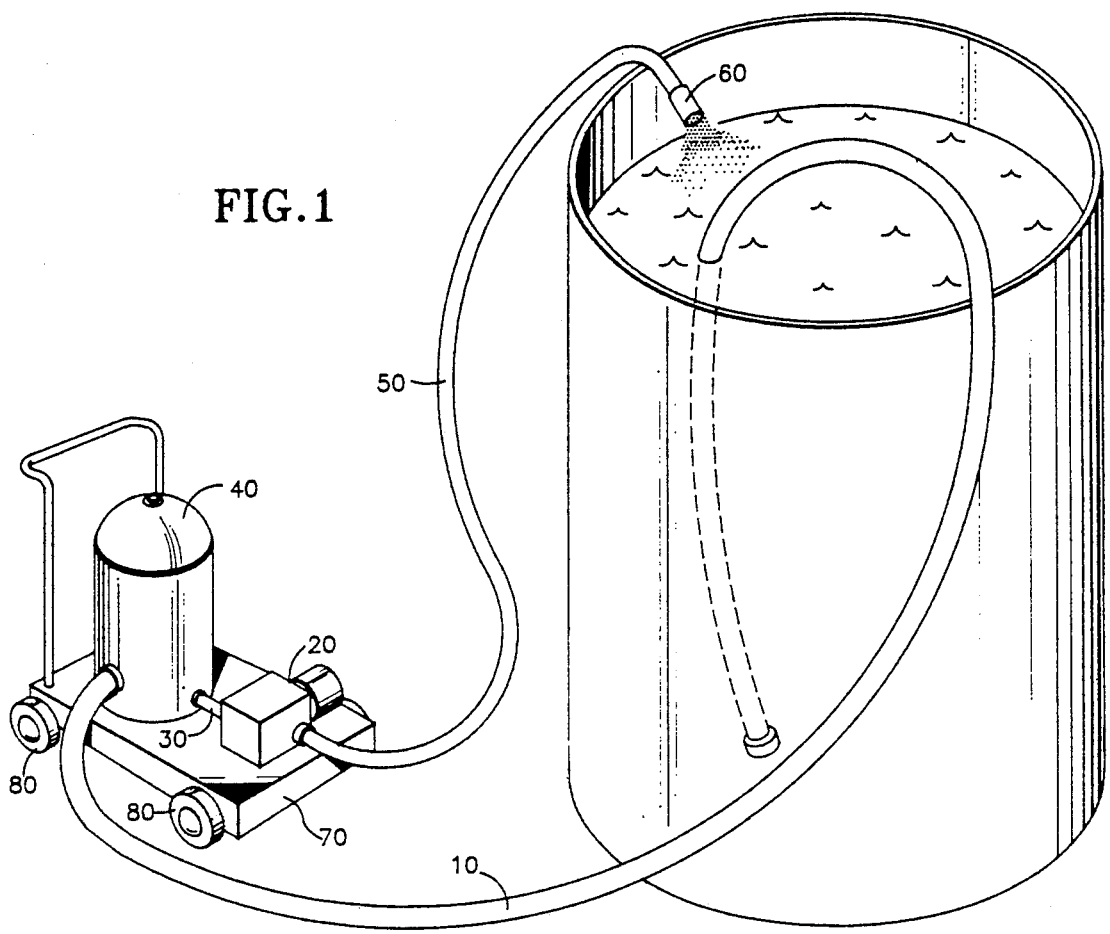
FIG. 1 is a possible embodiment of the present invention.

FIG. 1 is a possible embodiment of the present invention. It shows all the important features of the preferred embodiment of this invention; a double filtering system (initial filter system 40, final filter 60), a pump (20), the compact arrangement, and the cart (70). When the present invention is in operation, a liquid is sucked from a tank through the intake hose (10), the initial filter system (40), and the filter outlet hose (30) to the pump (20). From the pump (20), the liquid is pumped through the pump outlet hose (50) and the final filter (60) back into the tank. The double filtering system ensures that if fine particles pass through the initial filter system (40), the final filter (60) will remove the majority of them.

A common problem with pumps is clogging. Therefore, the preferred pump is a diaphragm pump for slurries, oils and other similar liquids, while a centrifugal pump is preferred for coolants and similar liquids. The Wilden Pump M4, produced by Wilden Pump & Engineering Company, Colton, Calif., is the especially preferred diaphragm pump. The compact arrangement and the cart (70), with wheels (80), is convenient, easily moved from one tank to another, and can easily be enclosed within a compartment for storage. Note, this system can be utilized with a filter located before the pump and a second filter after the pump, or both filters located before the pump.

Although the Wilden Pump is preferred, the type of pump, as with the type of filter, and tank, can be altered depending on the substance to be filtered. The parameters are the size of the contaminant particles to be filtered out and the characteristics of the substance; tank, filters, and pump must be composed of a non-reactive material. For example, if the substance must be kept under high temperature or pressure, if it is corrosive, acidic, or basic, or if the particles are very large or small, a different type of pump, i.e. stainless steel, plastic, diaphragm, or rotor, and/or a different size or type of filter may be necessary.

Figure 2:
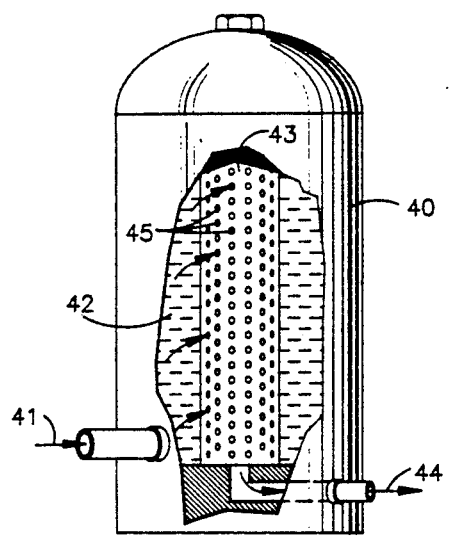
FIG. 2 is a cross sectional view of the filter tank used to filter slurries.
Figure 3:
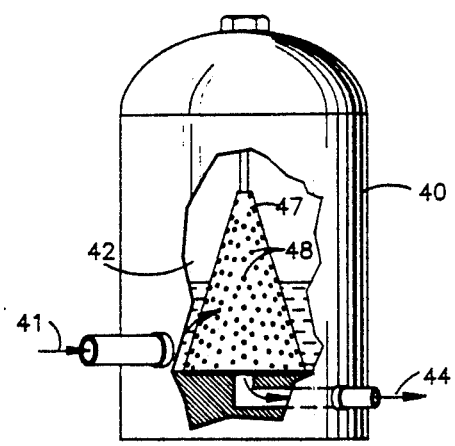
FIG. 3 is a cross sectional view of the filter tank used to filter oil.

FIGS. 2 and 3 show two different types of filters which can be used with the initial filter system (40, see FIG. 1) of the present invention. The filter (43) in FIG. 2 can be utilized with substances such as slurries, while the filter (47) in FIG. 3 is preferred for filtering oils. When filtering slurries (FIG. 2), the slurry enters the initial filter system (40) at point (41), fills the tank cavity (42) where the contaminants collect and settle. The liquid and small particles pass through the apertures (45) in the initial filter (43) and out of the initial filter system (40) at point (44). Although, when filtering oil, the oil follows the same path as the slurry, enters at point (41), surrounds the filter by occupying the cavity (42), and exits at point (44), the initial filter (47) utilized has significantly smaller pores (48) in order to effectively filter out the contaminants, such as metal slivers, in the oil.

Although this invention has been shown and described with respect to detailed embodiments thereof, it will be understood by those skilled in the art that various changes in form and detail thereof may be made without departing from the spirit and scope of the claimed invention.

We claim:

1. A device for filtering liquids, wherein said liquids are selected from the group consisting of slurry, oil, coolant, and paint, consisting essentially of:
   a. an initial filter;
   b. an intake hose connected to said initial filter;
   c. a pump;
   d. a filter outlet hose, wherein said filter outlet hose connects said initial filter to said pump;
   e. a final filter;
   f. a pump outlet hose, wherein said pump outlet hose connects said pump to said final filter;
   g. a cart, wherein the filtering device is mounted on said cart for easy mobility;

whereby the liquid passes through the intake hose, the initial filter, the filter outlet hose, the pump, the pump outlet hose, the final filter and is then deposited back into the tank.

2. A device as in claim 1 wherein the pump is selected from the group consisting of diaphragm pump and rotor pump.

3. A method for filtering liquids, consisting essentially of the steps of:
   a. using at least one filter;
   b. using a pump, wherein said pump is connected to at least one intake hose;
   c. connecting said pump with a filter;
   d. using at least one final filter, wherein said final filter is connected to said initial filter with an outlet hose;

whereby the liquid is taken into the pump through the intake hose, passes through the initial filter, out the outlet hose, and through the final filter.

4. A method for filtering contaminated liquids, wherein said liquids are selected from the group consisting of slurry, oil, coolant, and paint, consisting essentially of the steps of:
   a. filtering the liquid through an initial filter, wherein contaminants in the liquid are removed by said initial filter while the liquid and any fine particles pass through the filter; and
   b. pumping said liquid and fine particles through a pump and a final filter, wherein said final filter removes essentially all of the fine particles as the liquid passes through the final filter to a tank;

whereby the liquid is in essentially continuous motion as it is filtered.

* * * * *